United States Patent [19]
Hatch

[15] 3,668,094
[45] June 6, 1972

[54] NOVEL GLASSY COMPOSITIONS ZINC AND ALPHA HYDROXY DIPHOSPHONIC ACIDS

[72] Inventor: George Birdseye Hatch, Allison Park, Pa.
[73] Assignee: Calgon Corporation, Pittsburgh, Pa.
[22] Filed: Oct. 16, 1970
[21] Appl. No.: 81,559

[52] U.S. Cl.................................252/180, 21/2.7, 106/14, 252/8.55 E, 252/181, 252/389, 260/502.4 P
[51] Int. Cl....................C02b 5/06, C23f 11/16, C23f 14/02
[58] Field of Search......................252/389, 180, 181, 8.55 E, 252/82; 260/502.4 P; 106/14; 21/2.7

[56] References Cited

UNITED STATES PATENTS

| | | | |
|---|---|---|---|
| 3,303,139 | 2/1967 | Blaser et al. | 252/180 |
| 3,483,133 | 12/1969 | Hatch et al. | 252/389 |
| 3,518,203 | 6/1970 | Savinelli | 21/2.7 |
| 3,532,639 | 10/1970 | Hatch | 252/389 |
| 3,600,470 | 8/1971 | Lewis | 252/389 |

Primary Examiner—Leon D. Rosdol
Assistant Examiner—Irwin Gluck
Attorney—William L. Krayer and Herbert J. Zeh, Jr.

[57] ABSTRACT

Novel alkali metal zinc and ammonium zinc glasses of alpha hydroxy diphosphonic acids are disclosed along with the use of these glassy compositions in small concentrations to inhibit corrosion and scale formation in aqueous systems.

11 Claims, No Drawings

NOVEL GLASSY COMPOSITIONS ZINC AND ALPHA HYDROXY DIPHOSPHONIC ACIDS

BACKGROUND OF THE INVENTION

This invention is directed to novel alkali metal and ammonium zinc glasses of alpha hydroxy, 1,1 diphosphonic acids and their use as corrosion and scale inhibitors in aqueous systems.

Heretofore, the corrosion inhibitors in most widespread use have contained either inorganic polyphosphates or soluble chromate salts or combinations thereof. However, polyphosphates are hydrolytically unstable and have a tendency to hydrolyze and revert to the orthophosphate which can form objectionable deposits. Also, the toxic chromate containing corrosion inhibitors present a waste disposal problem. In addition, most presently used scale inhibitors are phosphates. Therefore, there has been an increasing demand for corrosion and scale inhibitors of a completely new class.

Certain derivatives of methanol phosphonic acids have been disclosed in the literature. Alkyl and aryl alpha hydroxyphosphonic acids and salts thereof long have been known. See, for example, Monatsch 5, 120,627 (1884); J. Am. Chem. Soc. 42, 2337 (1920); J. Am. Chem. Soc. 43, 1928 (1921); Belgian Pat. No. 678,912. See, also, U.S. Pat. No. 3,122,417 and U.S. Pat. No. 3,214,454. U.S. Pat. No. 3,159,581 shows the use of such compounds in detergent compositions. Also of interest are Belgian Pat. Nos. 655,166 and 672,168. In U.S. Pat. No. 3,122,417, mentioned above, a series of alkyl alpha hydroxy 1,1 diphosphonic acids is disclosed. The distinctive common feature of the compounds of my application Ser. No. 709,951, now U.S. Pat. No. 3,532,639, was the presence of one or more alpha hydroxy phosphonic acid groups. However, the preferred compositions of my patent were the alpha hydroxy 1,1 diphosphonic acids. This group of preferred compounds may be represented by the following formula

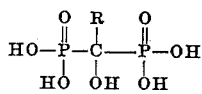

where "R" is independently selected from the group consisting of H, alkyl group of up to four carbon atoms and phenyl. I have found that mixtures of these compounds with zinc salts were excellent corrosion inhibitors.

SUMMARY OF THE INVENTION

I have now found that water-soluble mixed alkali metal zinc glasses or ammonium zinc glasses of alpha hydroxy 1,1 diphosphonic acids can be prepared containing up to about 21 percent by weight zinc. These compounds are excellent corrosion inhibitors, especially for iron and steel. They are also useful for scale control and as dispersing agents.

The alpha hydroxy 1,1 diphosphonic acids which are useful in my invention may be represented by the following formula

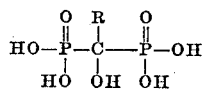

where "R" is selected from the group consisting of H, alkyl group of one to five carbon atoms, phenyl and benzyl.

I have prepared the mixed alkali metal and ammonium zinc glasses of my invention by evaporation of aqueous solutions which were prepared by using the following methods:

1. solution of metallic zinc in an aqueous alpha hydroxy 1,1 diphosphonic acid followed by neutralization to a pH of 9.0;
2. mixing an aqueous solution of a zinc salt with an aqueous solution of the alpha hydroxy 1,1 diphosphonic acid and, followed by neutralization to pH 5, filtration and solution of precipitate in a base in an amount such as to give a pH of 9.0;
3. precipitation of the normal zinc salt of the alpha hydroxy 1,1 diphosphonic acid followed by solution thereof with appropriate amounts of the tetrasodium salt of the alpha hydroxy 1,1 diphosphonic acid.

The preferred method for preparing the glasses of my invention is the use of method (1). In this reaction, zinc dust is added to the acid solution and hydrogen is liberated forming the partial zinc salt of the acid. Then, the remainder of the acid is neutralized with the desired alkali metal and/or ammonium hydroxide to give an aqueous solution of the glass. This solution is evaporated to give an amorphous glassy product which is the alkali metal and/or ammonium zinc glass of the alpha hydroxy 1,1 diphosphonate.

The water-soluble glasses of my invention contain from about 5 to 21 percent by weight zinc. The compositions of my novel glasses are best expressed as mole ratios of the various constituents. The alpha hydroxy diphosphonate is expressed as the anhydride and the alkali metal and zinc as the corresponding metal oxide. The glasses may then be represented by the following general formula

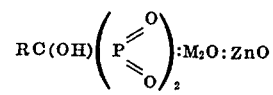

where "R" is as defined above and "M" is an alkali metal or ammonium or combinations thereof and when the moles of

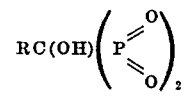

is 1, the moles of $M_2O$ range from 1 to 1.75 and the moles of ZnO range from 0.25 to 1.0.

Using the methods of preparation described above, I have prepared the various mixed glasses of my invention. The following examples illustrate a few of these preparations.

EXAMPLE 1

One mole of zinc dust was mixed with 1 mole of an 1,1 ethanol diphosphonic acid solution. When the liberation of hydrogen was complete, the solution was neutralized with 2 moles of sodium hydroxide. The neutralized solution was evaporated to give an amorphous glassy product which was the disodium zinc glass of 1,1 ethanol diphosphonic acid. This sodium zinc ethanol diphosphonate contained 20.8 percent by weight zinc and has a ratio of

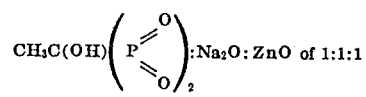

EXAMPLE 2

About one-half mole of zinc dust was mixed with 1 mole of an 1,1 ethanol diphosphonic acid solution. When the liberation of hydrogen was complete, the solution was neutralized with 3 moles sodium hydroxide. The neutralized solution was evaporated to give an amorphous glassy product containing 1 zinc atom for every 6 sodium atoms. This sodium zinc ethanol diphosphonate contained 10.7 percent by weight zinc and has a molar ratio of

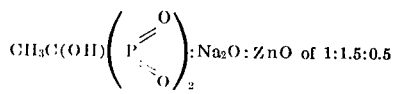
:Na$_2$O:ZnO of 1:1.5:0.5

EXAMPLE 3

In a manner similar to EXAMPLES 1 and 2 above, an amorphous product containing 1 zinc atom for every 14 sodium atoms was prepared. This sodium zinc ethanol diphosphonate contained 5.4 percent by weight zinc and had a molar ratio of

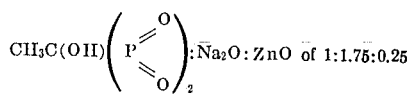
:Na$_2$O:ZnO of 1:1.75:0.25

EXAMPLE 4

One mole of zinc dust was mixed with 1 mole of a phenyl methanol diphosphonic acid. When the liberation of hydrogen was complete, the solution was neutralized with 2 moles of sodium hydroxide. The neutralized solution was then evaporated to give the disodium zinc phenyl methanol diphosphonate glass having a ratio of

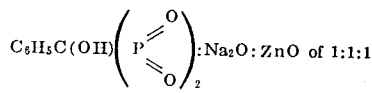
:Na$_2$O:ZnO of 1:1:1

EXAMPLE 5

In a manner similar to EXAMPLES 1 to 3 above, an amorphous product containing 1 zinc atom for every 14 ammonium atoms was prepared. This ammonium zinc glass of 1,1 ethanol diphosphonic acid had a molar ratio of

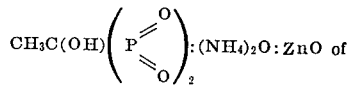
:(NH$_4$)$_2$O:ZnO of

1:1.75:0.25.

The product from EXAMPLE 5 was subjected to X-ray diffraction and microscopic evaluation. The results indicated that the product was a non-crystalline amorphous glassy solid.

The mixed glasses of my invention are quite highly soluble in water and I have prepared 40 percent by weight aqueous solutions with no problems. The zinc is bound quite tightly in the mixed salt and no precipitation occurs on elevation of the pH to 12.

I have performed numerous experiments which demonstrate the effectiveness of my glassy compositions as corrosion inhibitors. In these experiments, No. 1010 A 1S1 steel coupons were weighed and placed in beakers containing synthetic tap water at 35° C. and various amounts of the glassy corrosion inhibitors, expressed in ppm by weight. The water contained about 10 ppm bicarbonate, 18 ppm chloride, 82 ppm sulfate, 22 ppm calcium, 6 ppm magnesium and had a total hardness as CaCO$_3$ of about 80 ppm. The steel coupons were then agitated for 5 days. After the agitation period, the coupons were removed, cleaned and re-weighed. The amount of corrosion that had taken place was determined by the loss in weight of the coupons and expressed in terms of milligrams of metal consumed per square decimeter of surface area per day (mdd). The results are shown in the following tables.

TABLE 1

Inhibition of the Corrosion of Steel with Disodium Zinc Ethanol Diphosphonate from Example 1

| ppm of Inhibitor | Initial pH | Final pH | Corrosion Rate in mdd |
| --- | --- | --- | --- |
| 0 | 7.0 | 8.1 | 164 |
| 10 | 7.0 | 7.0 | 63.3 |
| 15 | 6.9 | 7.0 | 2.3 |
| 20 | 6.9 | 7.0 | 2.6 |
| 30 | 6.9 | 7.0 | 2.7 |
| 50 | 7.1 | 8.1 | 3.2 |
| 100 | 7.0 | 7.9 | 2.8 |
| 200 | 6.9 | 7.7 | 4.6 |

TABLE 2

Inhibition of the Corrosion of Steel with Disodium Zinc Ethanol Diphosphonate from Example 1

| ppm of Inhibitor | Initial pH | Final pH | Corrosion Rate in mdd |
| --- | --- | --- | --- |
| 0 | 8.9 | 9.4 | 83.1 |
| 50 | 9.0 | 9.4 | 0.8 |
| 100 | 8.9 | 9.4 | 0.1 |
| 200 | 9.0 | 9.4 | 0.7 |

I have found that when the corrosion inhibition of copper and copper alloys at a pH appreciably below about 7 is desired that it is more or less necessary to use a specific copper inhibitor with the mixed alkali metal or ammonium zinc glasses of the alpha hydroxy 1,1 diphosphonic acid. Examples of some of these copper specific inhibitors are described in my U.S. Pat. Nos. 2,941,953 and 2,742,369. These specific copper inhibitors include the 1,2,3 triazoles such as benzotriazole, the thiols of thiazoles such as 2mercaptobenzothiazole, the thiols of oxazoles such as 2-mercaptobenzoxazole and the thiols of imidazoles such as 2-mercaptobenzimidazole. These copper specific inhibitors should be used at a level of at least about 0.05 ppm, preferably at least about 0.5 ppm when used in conjunction with the alkali metal zinc glasses of alpha hydroxy 1,1 diphosphonic acid.

The mixed glasses of my invention when used as a corrosion inhibitor should be present in the aqueous system in concentrations of at least 5 ppm. I have found that about 5 ppm is necessary in order to show an appreciable reduction in the corrosion rate. The maximum amount of inhibitor used is largely dictated by economic considerations. However, for all practical purposes, concentrations greater than 200 ppm will seldom, if ever, be used. Concentrations above 200 ppm generally do not significantly improve the corrosion inhibition rate when compared to concentrations below 200 ppm.

The novel alkali metal and ammonium zinc glasses of my invention are useful in most aqueous systems where corrosion is a problem. Examples of some of the more common aqueous systems are cooling water systems and heating systems.

My novel glasses are also valuable scale inhibitors in threshold concentrations. They are especially valuable for this use since they do not add any extraneous ions to the system which may form a deposit. I have performed numerous experiments at various conditions utilizing various concentrations and compositions of the glassy phosphonates to evaluate the scale inhibition property of my compounds. In these experiments, I mixed solutions of two soluble salts in the presence of the glassy phosphonate inhibitor to form a solution containing a relatively insoluble salt at several times its equilibrium concentration. As a control, each experiment was also conducted in the absence of the inhibitor. By using the well-known Schwarzenbach titration, I determined the concentration of the soluble salt in solution at the end of each experiment. The concentration of the soluble salt in the control solution was taken as 0 percent inhibition and, if no precipitate had formed in the inhibited test solution, it was considered to be 100 percent inhibited. Titration results intermediate to 0 percent and 100 percent inhibition values were directly related to these extremes and converted to percent inhibition.

For example, in the case of the scale-forming salt, calcium carbonate ($CaCO_3$), I added, with agitation, 5 milliliters of 0.1 M $CaCl_2$ to a solution containing 490 milliliters of distilled water and 5 milliliters of 0.1 M $Na_2CO_3$. In the control experiment no inhibitor was present in the test solution. In other experiments various amounts of glassy phosphonate scale inhibitor were present. At the end of a storage period, the control solution contained both soluble calcium and calcium precipitated as calcium carbonate. Titration of the soluble calcium in the control solution indicated the concentration of calcium carbonate in solution. This calcium carbonate concentration was the equilibrium concentration under the conditions of the test.

Table 3 demonstrates the effectiveness of one of my glassy compositions in inhibiting the formation of calcium carbonate. The glassy phosphonate used was prepared in the manner illustrated by EXAMPLE 1.

TABLE 3

Inhibition of Precipitation of Calcium Carbonate 24 Hour Storage at 150°F

| Inhibitor Concentration in ppm by weight | Percent Inhibition |
|---|---|
| 0 | 0 |
| 0.15 | 57 |
| 0.20 | 75 |
| 0.25 | 89 |

The glassy compositions of my invention will effectively inhibit scale formation when used in "threshold" concentrations.

The "threshold" concentration range can be demonstrated in the following manner. When a typical scale-forming solution containing the cation of a relatively insoluble compound is added to a solution containing the anion of the relatively insoluble compound and a very small amount of a threshold active inhibitor, the relatively insoluble compound will not precipitate even when its normal equilibrium concentration has been exceeded. If more of the threshold active compound is added, a concentration is reached where turbidity or a precipitate of uncertain composition results. As still more of the threshold active compound is added, the solution again becomes clear. This is due to the fact that threshold active compounds in high concentrations also act as sequestering agents. Thus, there is an intermediate zone between the high concentrations at which threshold active compounds sequester the cations of relatively insoluble compounds and the low concentrations at which they act as threshold inhibitors. Therefore, one could also define "threshold" concentrations below that concentration at which this turbid zone or precipitate is formed.

The novel alkali metal and ammonium zinc glasses of my invention are useful in most aqueous systems where scale deposition is a problem. Examples are industrial cooling water systems, boiler water systems, evaporators and oil field applications. My glassy phosphonates are especially useful in systems where both corrosion and scale are problems since they will alleviate both problems.

I claim:

1. A water-soluble amorphous glassy composition represented by the formula

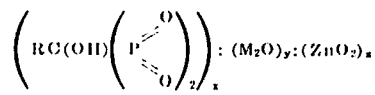

where "R" is an alkyl group of 1 to 5 carbon atoms, phenyl or benzyl and "M" is selected from the group consisting of an alkali metal, ammonium, or combinations thereof and where $x$ is 1 and $y$ is from 1 to 1.75 and $z$ is from 0.25 to 1.0.

2. A composition as in claim 1 wherein "R" is methyl and "M" is sodium.

3. A composition as in claim 1 wherein "R" is phenyl and "M" is sodium.

4. A method of inhibiting the corrosion of metals in a water system comprising maintaining in the water of said system at least about 5 ppm of a composition of the formula

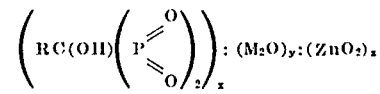

where "R" is an alkyl group of one to five carbon atoms, phenyl or benzyl and "M" is selected from the group consisting of an alkali metal, ammonium, or combinations thereof and where $x$ is 1 and $y$ is from 1 to 1.75 and $z$ is from 0.25 to 1.0.

5. A method of claim 4 wherein "R" is methyl and "M" is sodium.

6. A method of claim 4 wherein "R" is phenyl and "M" is sodium.

7. A method of inhibiting the corrosion of cuprous containing metals in a water system comprising maintaining in the water of said system at least about 5 ppm of a composition of the formula

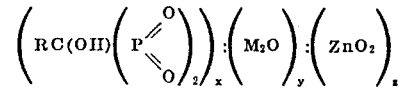

where "R" is an alkyl group of one to five carbon atoms, phenyl or benzyl and "M" is selected from the group consisting of an alkali metal, ammonium, or combinations thereof and where $x$ is 1 and $y$ is from 1 to 1.75 and $z$ is from 0.25 to 1.0, and at least about 0.05 ppm of a compound selected from the group consisting of 1,2,3 triazoles, thiols of thiazoles, thiols of oxazoles, and thiols of imidazoles.

8. Method of inhibiting the precipitation of scale-forming salts in an aqueous system and inhibiting the corrosion of metals in said system comprising treating the water of said system with a composition of the formula

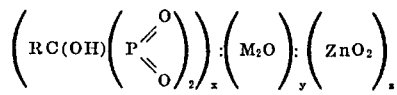

where "R" is an alkyl group of one to five carbon atoms, phenyl or benzyl and "M" is selected from the group consisting of an alkali metal, ammonium, or combinations thereof and where $x$ is 1 and $y$ is from 1 to 1.75 and $z$ is from 0.25 to 1.0.

9. A method of inhibiting the precipitation of scale-forming salts in an aqueous system comprising maintaining in the water of said system a threshold amount of a composition of the formula

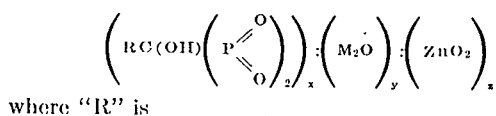

where "R" is an alkyl group of one to five carbon atoms, phenyl or benzyl and "M" is selected from the group consisting of an alkali metal, ammonium, or combinations thereof and where $x$ is 1 and $y$ is from 1 to 1.75 and $z$ is from 0.25 to 1.0.

10. Method of claim 8 wherein "R" is methyl and "M" is sodium.

11. Method of claim 8 wherein "R" is phenyl and "M" is sodium.

* * * * *